US009332566B2

(12) United States Patent
Zetterberg et al.

(10) Patent No.: US 9,332,566 B2
(45) Date of Patent: May 3, 2016

(54) METHOD AND ARRANGEMENTS FOR SCHEDULING WIRELESS RESOURCES IN A WIRELESS NETWORK

(75) Inventors: Kristina Zetterberg, Linköping (SE); Mehdi Amirijoo, Linköping (SE); Fredrik Gunnarsson, Linköping (SE); Johan Moe, Mantorp (SE); Birgitta Olin, Bromma (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 14/362,737

(22) PCT Filed: Dec. 5, 2011

(86) PCT No.: PCT/SE2011/051475
§ 371 (c)(1),
(2), (4) Date: Jun. 4, 2014

(87) PCT Pub. No.: WO2013/085437
PCT Pub. Date: Jun. 13, 2013

(65) Prior Publication Data
US 2014/0349695 A1    Nov. 27, 2014

(51) Int. Cl.
*H04B 7/216*     (2006.01)
*H04W 72/12*    (2009.01)
*H04W 24/08*    (2009.01)

(52) U.S. Cl.
CPC ...... *H04W 72/1242* (2013.01); *H04W 72/1247* (2013.01); *H04W 24/08* (2013.01)

(58) Field of Classification Search
CPC ............ H04W 72/1247; H04W 24/08; H04W 72/1242
See application file for complete search history.

(56) References Cited

U.S. PATENT DOCUMENTS 8,825,072 B2 *   9/2014   Kim ................. H04W 72/0486
                                          455/450
9,036,541 B2 *   5/2015   Narkar ..................... H04W 4/18
                                          370/328
(Continued)

FOREIGN PATENT DOCUMENTS

EP      1469641 A2     10/2004
WO    2009025592 A1    2/2009
WO    2011053784 A1    5/2011

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300 V8.2.0, Sep. 2007, 106 pages.
(Continued)

*Primary Examiner* — Bobbak Safaipour
(74) *Attorney, Agent, or Firm* — Patent Portfolio Builders, PLLC (57) ABSTRACT

The invention relates to a method for service aware scheduling of wireless resources in a wireless network. According to the inventive method, a service request for service delivery of a service type is received (51). A performance to value relationship for the service type is determined (52) and approximated (53) with a scheduling weight function associated with the service type. Previous performance for service delivery related to this service request is evaluated and approximated with a performance estimate (54). A scheduling weight is determined (55) by introducing the performance estimate in the scheduling weight function. Resource scheduling is performed (58) following a step of comparing (56) scheduling weights for on-going service requests. The invention also includes a network node and a system for service aware scheduling of wireless resources in a wireless network.

7 Claims, 5 Drawing Sheets

(56) References Cited

U.S. PATENT DOCUMENTS

| | | | | |
|---|---|---|---|---|
| 9,036,634 | B2* | 5/2015 | Arumugam | H04L 45/16 370/390 |
| 9,137,101 | B2* | 9/2015 | Keesara | H04L 43/0811 |
| 2007/0070894 | A1 | 3/2007 | Wang et al. | |
| 2008/0137537 | A1 | 6/2008 | Al-Manthari et al. | |
| 2009/0086705 | A1 | 4/2009 | Zisimopoulos et al. | |
| 2009/0172035 | A1* | 7/2009 | Lessing | G06Q 30/02 |
| 2011/0098834 | A1* | 4/2011 | Couronne | G06Q 10/06 700/100 |
| 2012/0099454 | A1 | 4/2012 | Jung et al. | |
| 2012/0113817 | A1* | 5/2012 | Fitzgerald | H04L 43/10 370/248 |
| 2012/0257497 | A1 | 10/2012 | Yoshimoto et al. | |
| 2014/0052463 | A1* | 2/2014 | Cashman | G06Q 20/18 705/2 |
| 2014/0279352 | A1* | 9/2014 | Schaefer | G06Q 40/04 705/37 |
| 2015/0079925 | A1* | 3/2015 | Hu | H04M 15/68 455/406 |
| 2015/0120303 | A1* | 4/2015 | Shinohara | G10L 13/00 704/258 |

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 23.203 V11.1.0, Mar. 2011,135 pages.

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 10)", 3GPP TS 23.401 V10.3.0, Mar. 2011, 278 pages.

EP office action in application No. 11877028.8, mailed Aug. 25, 2015.

EP office action in application No. 11877028.8, mailed Apr. 15, 2015.

* cited by examiner

METHOD AND ARRANGEMENTS FOR SCHEDULING WIRELESS RESOURCES IN A WIRELESS NETWORK

CROSS REFERENCE TO RELATED APPLICATION(S)

This application is a 35 U.S.C. §371 National Phase Entry Application from PCT/SE2011/051475 filed Dec. 5, 2011, the disclosure of which is incorporated by reference.

TECHNICAL FIELD

The present invention relates to service aware scheduling of resources in a wireless network. The invention relates to a method, a network node and a system for such scheduling.

BACKGROUND

In typical wireless communication networks, also known as cellular radio networks, user equipment communicate via a radio access network to one or more core networks. The user equipments may be mobile telephones or other mobile units with wireless capability, e.g. mobile terminals, laptops, car-mounted mobile devices which communicate voice and/or data with the radio access network.

The radio access network covers a geographical area which is divided into cell areas, with each cell area being served by a base station, known as e.g., eNodeB, eNB, or RBS. A cell is a geographical area where radio coverage is provided by the radio base station equipment at the base station site. The base stations communicate over the air interface with the user equipments within range of the base stations; operating on radio frequencies. Each radio base station in the access network has a limited budget of radio transmission resources that may be used to provide radio/wireless connectivity.

Long Term Evolution (LTE) is a fourth generation mobile communication system, following the Global System for Mobile Communications (GSM) and Wideband Code Division Multiple Access (WCDMA).

Scheduling is a key function to manage the limited radio resources in the radio access network. The scheduling functionality is typically included in a scheduler located in each base station. Each scheduler includes a radio resource management mechanism that is used to allocate radio resources to user equipment in the corresponding cell. The scheduler selects the user equipment to be scheduled and distributes the available transmission resources, such as frequency and time slots, to different user equipment.

The scheduler may base the scheduling decisions on some sort of priority or weight that changes over time based on for example the time since a user equipment last was scheduled or the current radio conditions. Some radio access technologies, e.g., E-UTRAN and UTRAN, include scheduling functionality supporting dynamic scheduling of uplink (UL) and/or downlink (DL) data. The communication from the base station to the user equipment is performed on downlink (DL) and the communication from the user equipment to the base station is performed on uplink (UL).

The transmission resources may be assigned to users and radio bearers according to the users' momentary traffic demand, QoS requirements, and estimated channel quality. Conventional scheduling include efficiency-driven scheduling promoting a high data volume, fairness-driven scheduling promoting a sequential scheduling in accordance with the time of request for a service, or priority-driven scheduling according to assigned priorities for requesting user equipment or the requested services. In a fully loaded network, it will not be possible to schedule radio resources to all requesting user equipment.

Although many different scheduling methods are available today, the known solutions are inadequate in many aspects. While standardization has introduced a framework for service differentiation in the scheduling of different services, scheduling methods at hand are inflexible and do not support dynamical value oriented resource assignment, aiming at maximizing user and/or operator value at every time.

SUMMARY

It is an object of the present invention to provide an improved method of scheduling and allocating radio resources to a user equipment node in a wireless network.

This object is achieved through the inventive method, wherein a service request for service delivery of a service type is received in the radio access node. A performance to user value relationship is retrieved for a service delivery of the service type. Similarly, a performance to operator value relationship is retrieved for a service delivery of the service type. The performance to user value relationship is combined with he performance to operator value relationship and approximated with a scheduling weight function associated with the service type. The radio resource scheduling is performed based on the scheduling weight function.

It is another object of the invention to provide improved arrangements for scheduling radio resources to user equipment in a wireless radio network.

This object is achieved through a scheduling weight deriver in an operation and support system for use in the method of service aware scheduling of wireless resources in a wireless network. The scheduling weight deriver includes a first interface, whereby a service provider inputs information on a performance to user value relationship, a second interface, whereby an operator inputs information on a performance to operator value relationship and means to approximate the performance to user value relationship and the performance to operator relationship with a scheduling weight function reflecting an aggregated performance to value relationship.

The object is also achieved through a network node for service aware scheduling in a wireless network. The network node comprises a scheduling weight deriver arranged to receive information identifying a service type for a received service request, to retrieve information on a performance to user value relationship for the service type, to further retrieve information on a performance to operator value relationship and to determine a scheduling weight for the service request. A scheduler receives the scheduling weight and performs scheduling based on this scheduling weight.

The object is further achieved through the inventive system for service aware scheduling in a wireless network. The system comprises a service identifier, a configuration provider and a scheduling weight deriver as disclosed for the network node, but may in the inventive system be configured in different nodes in the wireless system. The system further includes a scheduler that receives the output from the scheduling weight deriver and schedules wireless resources based on a combination of scheduling weight and an expected transmission performance.

BRIEF DESCRIPTION OF THE DRAWINGS

FIG. 1 Exemplifying LTE architecture
FIG. 2 Diagram illustrating priority based scheduling
FIG. 3 Diagram illustrating value based scheduling FIG. 4 Block diagram illustrating an embodiment of a wireless communication network FIG. 5 Flow chart of an embodiment of the inventive method for scheduling radio resources FIG. 6 Block diagram illustrating an embodiment of an inventive network node FIG. 7 Block diagram illustrating an embodiment of an inventive system

DETAILED DESCRIPTION OF THE DRAWING

Figure 1:
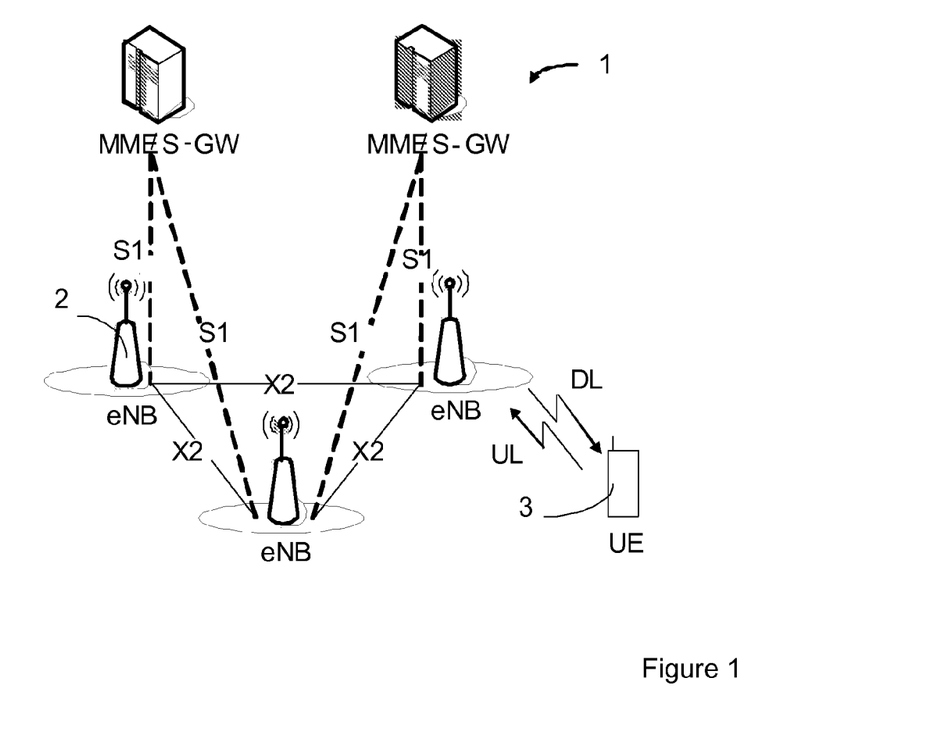

FIG. 1 discloses an exemplifying wireless network 1 based on 3GPP LTE wherein mobile terminals UE receive varying types of service deliveries for which the future performance would benefit from reporting of terminal service evaluations. The wireless network 1 includes a radio access system or network (RAN) such as E-UTRAN, comprising at least one radio base station 2 (eNB). The RAN is connected over an interface such as the S1-interface to at least one core network, which is connected to external networks, not shown in FIG. 1. The core network comprises mobility management entities (MME) which handles control signaling for instance for mobility.

The RAN provides communication and control for a plurality of user equipments (UE) 3, and each of the radio base stations 2 is serving a respective cell in which the UEs 3 are located and possibly moving. Each of the user equipments 3 uses a respective downlink channel (DL) and a respective uplink channel (UL) to communicate with the radio base station 2.

The wireless network and communication system is herein described as an LTE radio access network. However, the skilled person realizes that the inventive method, system and network node work on other wireless networks as well.

Figure 2:
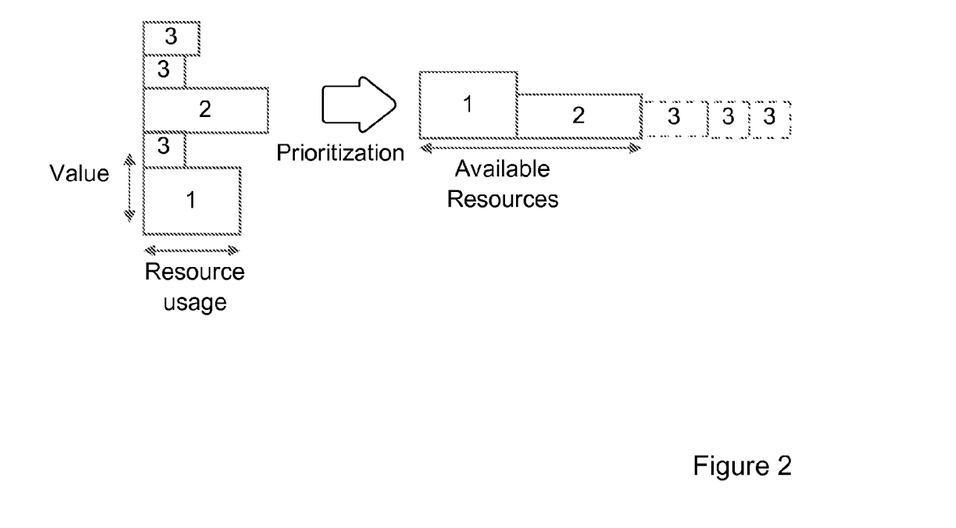
Figure 3:
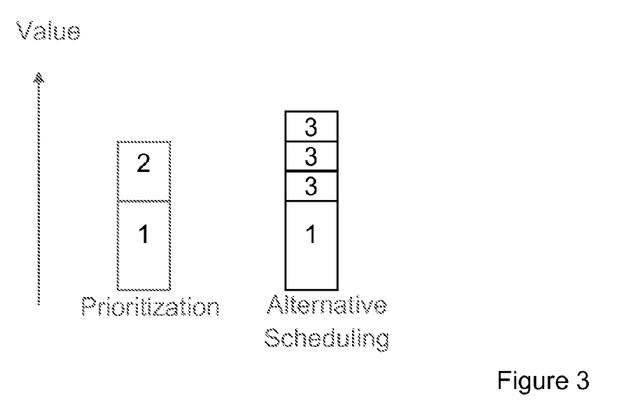

FIG. 2 discloses priority based scheduling according to prior art. Three different services 1, 2 and 3 are assigned a different priority value by the operator. The priority value may be the value to the operator of delivering the service. This is illustrated in FIG. 2, where five boxes correspond to five different users using one of the services 1, 2 or 3. The height of the boxes corresponds to the value obtained by scheduling the service, while the width of the boxes corresponds to the resources needed to obtain the value. It can be seen that the same value is obtained by all the users using service 3, but the resource usage varies, which is a result of the different radio conditions of the users. In the example the network is fully loaded, meaning that all users cannot be scheduled. A scheduler using a value based, static prioritization would schedule the users using service 1 and service 2 first, and leave out the three users using service 3, even though the total value would be higher if all three users using service 3 would have been scheduled instead of the user using service 2, as illustrated in FIG. 3.

Figure 4:
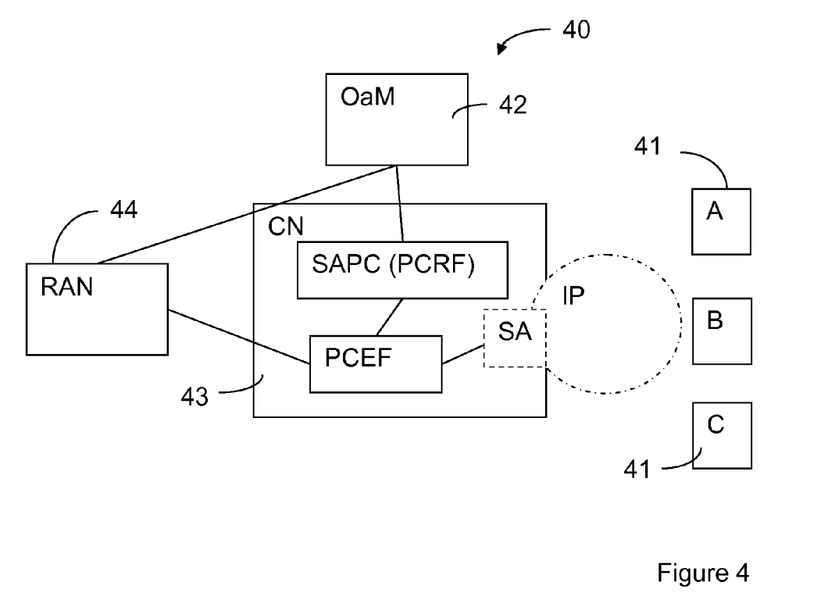

FIG. 4 discloses a block diagram illustrating an embodiment of a wireless communication network wherein the inventive method is practice. The wireless communication network includes a radio access network (RAN) node 44, a core network (CN) node 43, an operation and maintenance (OaM) system 42 providing an operator interface to the RAN 44 and the CN 43, and an IP interface to a set A-C of service providers 41. The CN includes a PCRF—policy and charging rules function, also denoted service aware policy controller (SAPC). The CN further includes a policy and charging enforcement function (PCEF) that may perform Deep Packet Inspection (DPI). This function may be implemented in a service aware support node (SASN) or some other core network node. A service accelerator (SA) may cache service data on behalf of a service provider, and have negotiated service information sent from the service provider. The negotiated service information may include detailed service information as well as service indications describing the content. The detailed service information may consist of one or more of, but not limited to, service coding information such as codec details and suitable bitrates, error correction precautions, latency requirements, mean opinion score information, etc. This means that the service accelerator may be capable of providing details concerning the predicted end user perceived quality and value, as well as indicating which service description the received data should be associated to. The service accelerator may convey service information to the OaM system or to the operator core network.

The PCEF implements the deep packet inspection mapping a first service identifier to a second service identifier representing the performance to value for an operator as well as a user. The first service identifier could be provided via IP packet marking.

In an embodiment for implementing the invention in the wireless network structure disclosed in FIG. 4, the PCEF identifies the service type of a service request and associates packets to a service identifier, and/or to different bearers. Information relating to performance to value for the user/operator is submitted to the RAN through the OaM. The OaM may also combine user and operator values into a combined user/operator value. One example is that the operator value is a function of the user value.

The OaM may also receive service information directly from the service provider, either via business agreements, or via enriched service descriptions. The service information can also be aggregated in a node based on service quality reports from the user terminals.

Service definitions may also be standardized, whereby the service provider (service identifier) provides more details about the service including a performance to user value. The performance to operator value is configured through the OaM to RAN (also configuration provider).

Figure 5:
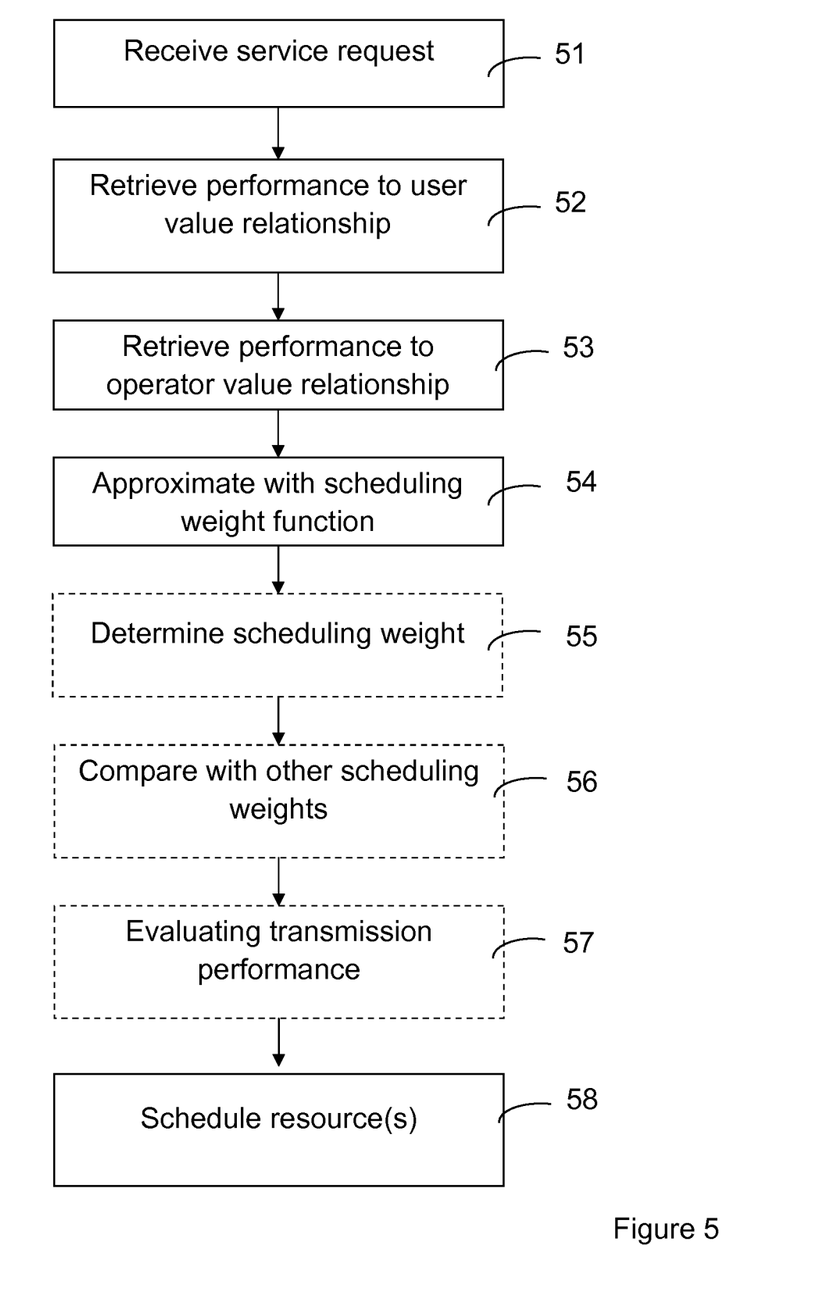

FIG. 5 discloses a flow chart of an embodiment of the inventive method for scheduling radio resources to a user equipment node in a wireless network. In a first step 51 a service request is received in a network node, e.g., a radio access node, from user equipment in the scheduling domain of the network node. The service request relates to a specified service type. Such service types may e.g. be conversational voice, conversational video, real time gaming, non-conversational video IP multimedia subsystem (IMS) signaling, live streaming video, interactive gaming, buffered streaming video etc.

In a subsequent step 52, the performance of the service is mapped to the user value; thus forming a performance to user value relationship. The performance to value relationship could include information relating to a mapping of the performance of a service to the user value in terms of for example quality, or mean opinion score (MOS). The performance may be expressed as a performance function, depending on for example throughput and/or delay margin. The performance function may look different for different services and users, but should be normalized in a way to make them comparable. For example, for a delay sensitive service, such as video telephony, the performance would depend mainly on the delay margin, while for a service where throughput is more important, the performance function would depend mainly on throughput. Different relations may be defined for different service and user subscription combinations.

The performance to user value mapping could be predefined by the service provider. Default mappings for the most common services may be preconfigured by the vendor in the radio access network or an operation and support system (OSS) in the core network. However, performance to user value mapping may also be redefined at any time in the wireless network through a service accelerator in the core network.

The performance to operator value relationship is retrieved in another step 53. This performance to operator relationship could include information relating to the performance of a service mapped to an operator value in terms of for example overall quality, total user satisfaction, goodwill or even money. This could for example be done by translating the user value into operator value and using the performance to user value mapping. For example, if a mapping of throughput to mean opinion score (MOS) is available, this could be translated to a mapping of throughput to operator value by defining the operator value for each MOS. The value would typically depend on service, subscription type and the business model of the operator and is hence best suited to be defined by the operator. Thus the operator value could be dependent upon the user value. However, the operator value could also be set independently of the perceived user value.

The performance to value relationship is approximated with a scheduling weight function in step 54. The step includes combining the performance to user value relationship with the performance to operator value relationship and approximating the combined the performance to value relationship with a continuous function, a value curve. The value curve could represent a concave function, whereupon the resulting value curve will have a continuously decreasing derivative. The value curve may be scaled with the spectral efficiency, or the number of bits that can be transmitted per resource block, for each user. The scaling could be based on signal to interference and noise ratio (SINR) of the user or any other suitable measurement. Following the scaling, a user equipment that can transmit a certain number of bits using only a few resources relatively will be valued higher for a given service than a user equipment with worse radio conditions that need more resources to transfer the same amount of bits. The value curved is translated into a scheduling weight function, e.g., by differentiating the value curve, obtaining the value increase per performance increase. Performance can be a function of for example throughput and/or delay margin. Using the derivative of the value curve as the scheduling weight function, a scheduling based on this scheduling weight function will prioritize a user that will increase the (relative) user or operator value the most given the current performance.

In an alternative embodiment, the value curve is used together with an approximation of the performance increase that can be obtained by scheduling the user at the given time instant to form a scheduling weight function. The resulting value increase from this scheduling is mapped to scheduling weight using a linear transformation.

Previous performance for service delivery of the service type is evaluated. A performance estimate is generated that in step 55 is applied to the scheduling weight function in order to determine scheduling weight for the service request.

Information on scheduling weight for the service request is forwarded to a conventional scheduler in the radio access node. In step 56, scheduling weights for valid scheduling requests are compared. The scheduling is concluded in step 57, where radio resources are allocated to a scheduling request having the most significant scheduling weight, in the sense that a higher scheduling weight is more significant than a lower scheduling weight. A pre-requisite for the scheduling is that sufficient radio resources are available to fulfill the resource requirements for the service request.

The steps disclosed for the embodiment illustrated in FIG. 4, may be executed in the radio access network or the core network. However, it is preferable that the steps 54-55 relating to actually obtaining the scheduling weight are performed in the radio access network close to the scheduler performs the actual grant of radio resources for the received service request.

The method disclosed in FIG. 5 and any other embodiment of the inventive method, may be built upon existing interfaces and protocols with only limited refinement of underlying semantics. However, the additional configuration information is required in the interface between the network management system/OSS system and the radio access network as well as the core network. In the case of network management system centered management, the information would flow on itf-N (3GPP).

Figure 6:
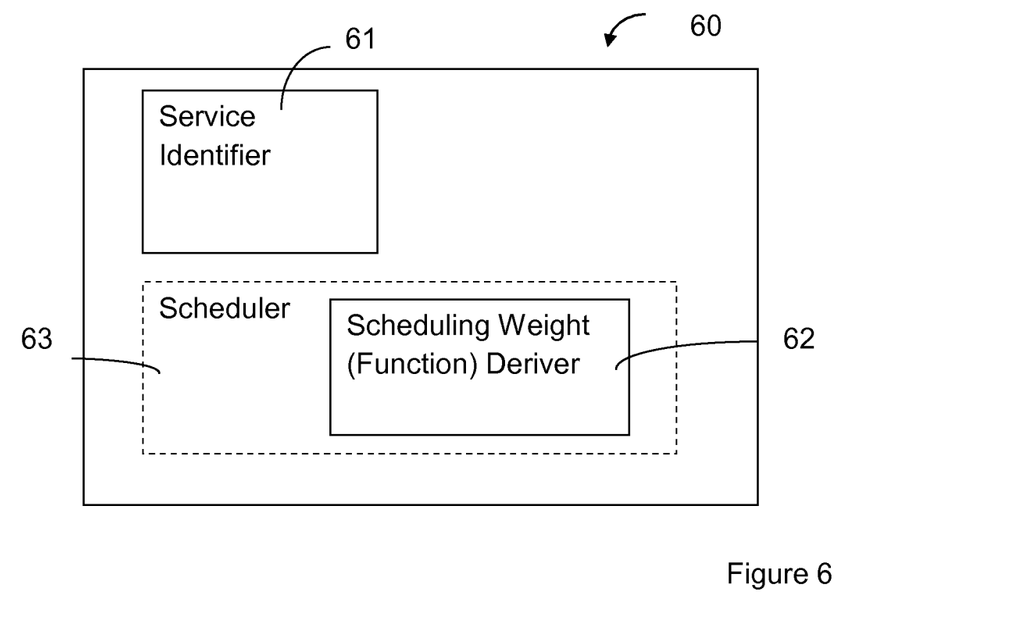

In FIG. 6, an embodiment of an inventive network node 60 is illustrated in a block diagram format. A service identifier 61 is arranged to identify a service type and expected delivery associated with a service request.

A scheduling weight (function) deriver determines a scheduling weight function or scheduling weight. The scheduling weight (function) deriver receives a service indication from the service identifier 61 and input from a configuration provider. The configuration provider could be arranged in a network management system, the OSS system or any other entity by means of which the operator or service provider may configure a service. The service identifier 61 transfers service information in the form of a service indication to the scheduling weight (function) deriver.

The configuration provider is arranged to deliver a performance to user and/or operator value mapping per service and user subscription also known as a performance to value relationship. The performance to value relationship is received in the scheduling weight (function) deriver 63. That performs the steps 53-55 disclosed in FIG. 5 and previously discussed. The determined scheduling weight is communicated to a scheduler 63 that effects the actual scheduling of radio resources for a service request FIG. 6 discloses an embodiment wherein the service identifier, the scheduling weight (function) deriver and the scheduler are part of a common network node. However, it is obvious to the person skilled in the art that the service identifier could be part of a network node in the radio access network as well as in the core network. The scheduling weight (function) deriver is preferably arranged in the radio access network, with one scheduling weight (function) deriver associated with a corresponding scheduler in each radio base station. The scheduling weight (function) deriver may be arranged as part of the scheduler, as disclosed in FIG. 5, but could also be a separate logical entity within the network node.

Figure 7:
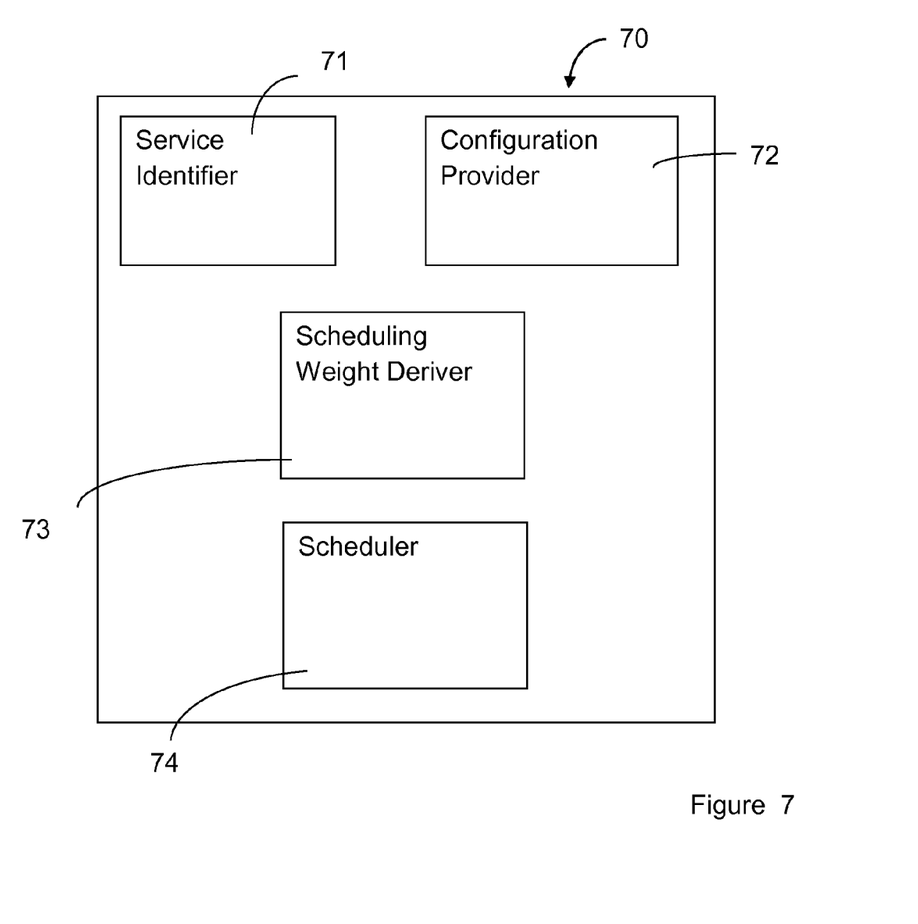

In FIG. 7, an embodiment of an inventive system 70 for service aware scheduling is illustrated in a block diagram format. The system includes a service identifier 71 arranged to identify the service configuration associated with a service request and to transfer this information in the form as a service identification. The service identifier could be located in one or more of a radio access node, a control node, a service provider and/or a service accelerator.

A configuration provider 72 provides the configuration per service, including the performance to value relationship based on operator and/or user value mapping. The configuration provider could also derive a performance to weight mapping based on the mapping of performance related to operator and/or user value. The configuration provider 72 is preferably part of a control node, i.e., a network management system, en operation and maintenance system, a service provider and/or a service accelerator.

The scheduling weight deriver 73 receives service information and service configuration including operator/user value per service. A scheduling weight function or a scheduling weight is derived, e.g. according to the method embodiment described in relation to FIG. 7. The information from the configuration provider includes a service configuration including a weight function per service. The output from the scheduling weight deriver may be scaled with the transmission performance, e.g., the spectral efficiency, the number of bits that can be transmitted per resource block for each user, and the power headroom. The scaling will provide a result indicating that a user equipment that may transmit a certain number of bits using only a few resources will be valued higher than a user equipment with conditions that require more resources for the transfer of the same amount of bits.

A scheduler 74 in the radio access node receives the output from the scheduling weight deriver. A scheduling decision is based on the output from the scheduling weight deriver. In an embodiment of the invention, the scheduling weight deriver may be included in the scheduler as disclosed in FIG. 6.

The description above discloses the best mode presently contemplated for practising the invention, but should not be perceived as limiting to the to invention. The scope of the invention should only be ascertained with reference to the issued claims.

The invention claimed is:

1. A method for service aware scheduling of wireless resources in a wireless network comprising:
   receiving, by a network node, a service request for service delivery of a service type;
   retrieving, by the network node, a performance to user value relationship associated with the service request for service delivery of the service type, wherein the performance to user value relationship relates to mapping of performance of a service to a user value;
   retrieving, by the network node, a performance to operator value relationship associated with the service request for service delivery of the service type, wherein the performance to operator value relationship relates to mapping of performance of the service to an operator value;
   approximating, by the network node, the performance to user value relationship and the performance to operator value relationship with a scheduling weight function; and
   scheduling, by the network node, wireless resources based on the scheduling weight function.

2. The method according to claim 1, wherein the scheduling weight function is associated with service delivery of the service type.

3. The method according to claim 1, wherein a scheduling weight is determined by applying a performance estimate of previous performance for service delivery of the service type to the scheduling weight function.

4. The method according to claim 3 further including a step of comparing, by the network node, the scheduling weight with scheduling weights for competing service requests and performing the scheduling of wireless resources based on this comparison.

5. The method according to claim 1, further including a step of evaluating, by the network node, a transmission performance prior to scheduling.

6. The method according to claim 1, wherein the performance to user value relationship is defined by a service provider in a network management system, an operation support system, a service accelerator or a core network node.

7. The method according to claim 1, wherein the performance to operator value relationship is defined by an operator in a network management system, an operation support system, a service accelerator or a core network node.

* * * * *